UNITED STATES PATENT OFFICE.

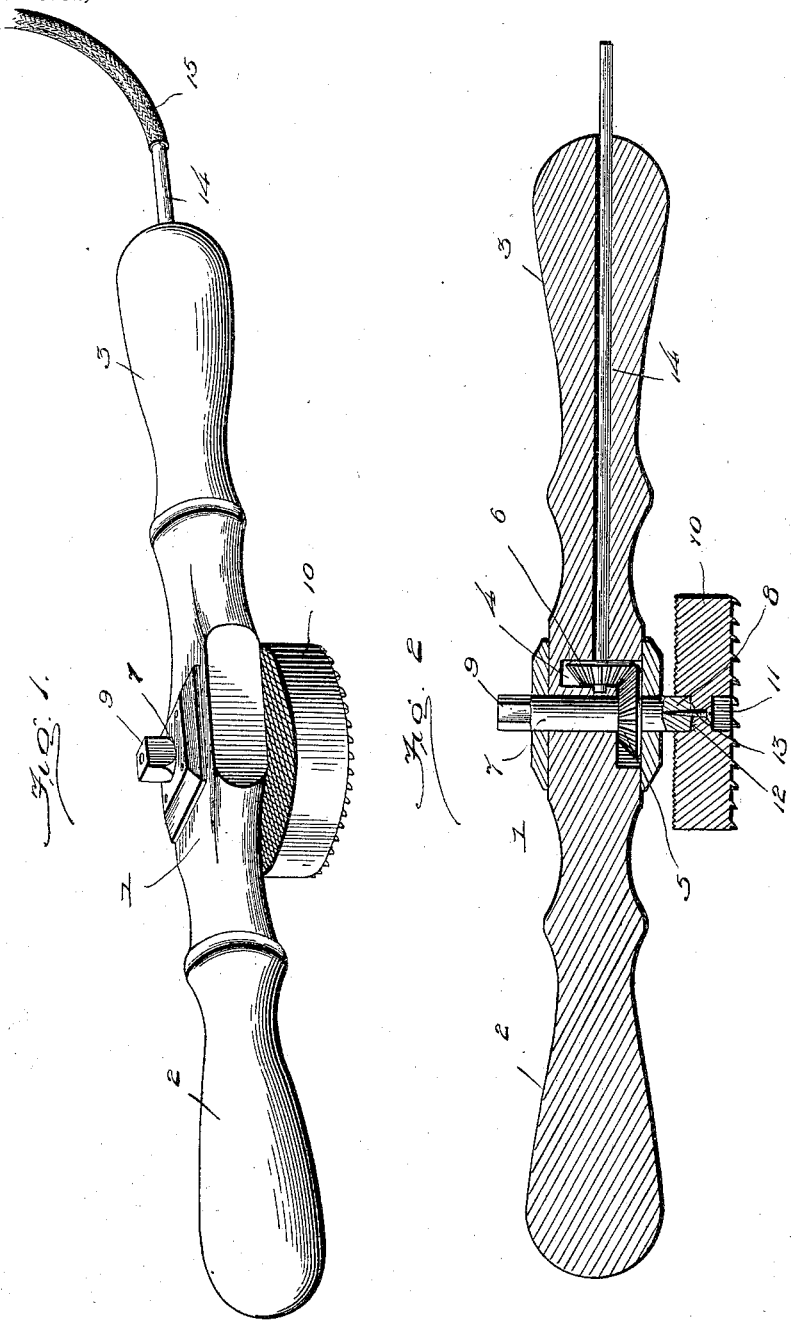

JOHN P. DAGGETT, OF FORT WORTH, AND HARDY HESTAND, OF DUNDEE, TEXAS.

HORSESHOEING-RASP.

SPECIFICATION forming part of Letters Patent No. 695,285, dated March 11, 1902.

Application filed August 9, 1901. Serial No. 71,505. (No model.)

*To all whom it may concern:*

Be it known that we, JOHN P. DAGGETT, residing at Fort Worth, in the county of Tarrant, and HARDY HESTAND, residing at Dundee, in the county of Archer, State of Texas, citizens of the United States, have invented new and useful Improvements in Horseshoeing-Rasps, of which the following is a specification.

This invention relates to the general class of rasps, but more particularly to a rotating rasp which is particularly designed for horseshoers; and the primary object thereof is to provide a device of the character described which may be mechanically operated and yet be portable and easily handled to cut away the superfluous hoof after the shoe has been applied, and also to give a finished appearance to the hoof and smooth down any abrasion or projecting nails which may appear during the process of shoeing the animal.

A further object of the invention is to provide an improved means for trimming the hoof of the animal to which the shoes are to be applied.

A still further object is to provide an improved means for sharpening the calk of a shoe while on the horse's hoof.

Other objects, as well as the peculiar details of construction, will be described hereinafter, and the novel features will be defined in the claims and illustrated in the accompanying drawings, in which—

Figure 1 is a perspective view of a rasp constructed in accordance with the present invention, and Fig. 2 is a vertical longitudinal sectional view through the same.

Referring now to the drawings by numerals of reference, 1 designates a bar of any preferred material having handle portions 2 and 3 at its respective ends. Intermediate the ends of the bar 1 is arranged an L-shaped recess 4, in which are arranged bevel-gears 5 and 6. The gear 5 is fixed to a revoluble shaft 7, which is arranged at right angles to the handles and is provided with projecting ends, which extend through the side walls of the bar 1 and are formed into angular heads 8 and 9. On either of the heads 8 and 9 is arranged a double-faced cutting disk or rasp 10, on one side of which are coarse cutting-teeth, while on the opposite side is arranged a finer cutting-surface. We have illustrated the disk as being secured on the head 8 of the shaft 7, although it is obvious that it may be secured on the opposite side, if desired. Each disk is provided with oppositely-disposed angular recesses 11 and 12, which coincide with the heads 8 and 9, whereby the disk may be secured to either of said heads through the medium of a screw 13. If desired, two disks may be fastened to the shaft at one and the same time, said disks having varying or different degrees of cutting-surfaces thereon.

14 designates a longitudinally-extending shaft which projects through one of the handles and is keyed to the gear-wheel 6. This shaft is designed to be driven by a flexible shaft 15 by any suitable power which will drive the gear-wheel 6, thus in turn imparting motion to the gear-wheel 5, and by rotating the shaft 7, to which said gear-wheel 5 is keyed, the cutting-disks 10 will be driven.

In operation, all the parts being assembled in proper position, the handles are grasped and the device is moved over the surface to be dressed. After the coarser surface is removed the disk may be reversed, so that the finer cutting-surface will act upon the material and a smooth finish imparted.

It will thus be seen that we have provided a cheap, durable, and efficient device of the character described and one which may readily perform the work for which it is intended.

Having thus fully described our invention, what we claim as new, and desire to secure by Letters Patent, is—

1. In a device of the character described, the combination with a bar; a shaft carried thereby; a cutting-disk secured to said shaft; gears for driving the shaft; and a second shaft arranged within the bar for driving said gears.

2. In a device of the character described, the combination with a bar formed into handles at each end thereof; a shaft arranged at right angles to said handles; a removable and reversible cutting-disk carried by the shaft; and means for driving said shaft.

3. In a device of the character described, the combination with a bar, the ends of which are formed into handles; a shaft arranged at right angles thereto and having extensions which project through the handle and which are formed into angular heads; a removable and reversible cutting-disk carried by the said shaft and secured to a head; a second shaft arranged longitudinally of and within one of the handles; gears connecting the shafts, and means for driving the second shaft.

In testimony whereof we affix our signatures in presence of two witnesses.

JOHN P. DAGGETT.
HARDY HESTAND.

Witnesses:
C. SWANSON,
J. D. SMYTH.